United States Patent

[11] 3,582,795

[72] Inventor Robert B. Heick
Eatontown, N.J.
[21] Appl. No. 849,997
[22] Filed Aug. 14, 1969
[45] Patented June 1, 1971
[73] Assignee Bell Telephone Laboratories, Incorporated
Murray Hill, N.J.

[54] DELAYED CLOCK PULSE SYNCHRONIZING OF RANDOM INPUT PULSES
10 Claims, 25 Drawing Figs.

[52] U.S. Cl. .......... 328/63, 178/69.5, 307/208, 307/269, 328/72, 328/179
[51] Int. Cl. .......... H03k 1/00, H03k 3/04
[50] Field of Search .......... 307/208, 269, 293; 328/63, 72, 155, 179; 178/69.5

[56] References Cited

UNITED STATES PATENTS 2,992,411 7/1961 Abbptt .......... 307/269X
3,044,065 7/1962 Barney et al. .......... 328/63X
3,218,560 11/1965 Peters .......... 307/269X

*Primary Examiner*—Stanley D. Miller, Jr.
*Attorneys*—R. J. Guenther and James Warren Falk

ABSTRACT: Each input pulse transition (low-to-high or high-to-low) gates 10KHz. clock pulses to a pulse counter. When the counter arrives at a count of 50 (5 milliseconds) it toggles an output flip-flop which (1) repeats the transition in synchronism with the clock but delayed 5 milliseconds and (2) resets the counter to zero. A clock gate permits the counter to accumulate clock pulse count when the input and output states are different and prevents the counter from accumulating clock pulse count when the input and output states are the same, thus taking into account fine chatter at the input transitions to extend the 5 millisecond time an amount depending upon the nature and extent of fine chatter. An analog input timer is energized whenever the input and output states are the same: the input timer will reset the counter after a prescribed energized time, thus to clear the counter of any partial count (less than an accumulation of 5 milliseconds) so as to disregard input pulse transitions existing with or without fine chatter for less than 5 milliseconds. An analog output timer is energized each time the output flip-flop repeats a low-to-high transition: the energized output timer bridges input pulse splits for 15 milliseconds by preventing input transitions from affecting the rest of the circuit for that length of time.

INVENTOR
R. B. HEICK
BY [signature]
ATTORNEY

NAND

NAND

INVERTER

INVERTER

LOGICAL AND

LOGICAL AND

DELAY

DELAY

DELAY

SINGLE SHOT

SINGLE SHOT

SINGLE SHOT

D TYPE FLIP FLOP

DECADE UP COUNTER

INPUT TIMER

INPUT TIMER

INPUT TIMER

OUTPUT TIMER

OUTPUT TIMER

OUTPUT TIMER

PATENTED JUN 1 1971

3,582,795

DELAYED CLOCK PULSE SYNCHRONIZING OF RANDOM INPUT PULSES

BACKGROUND OF THE INVENTION

The field of the present invention is generally the pulse repeater art. In that general field, the present invention relates to the particular area of synchronizing random input pulse transitions with clock pulses. More specifically, random input pulses are repeated without essential change in character as delayed-clock-pulse-synchronized output pulses.

Standards are established for pulsing depending upon the purpose of the pulsing and the circuits to be responsive to the pulsing. Generally, a pulse transition, say from low-to-high, must persist (remain high) for a specified minimum length of time to be recognized as a legitimate pulse signal instead of merely an accidental or spurious pulse. Also, fine chatter at a pulse transition may be taken into account or disregarded. Furthermore, a pulse transition may last beyond the minimum but may thereafter include a split or bounce condition which also may be taken into account or disregarded. By way of example, in telephone dial pulsing one might require a transition to last for at least 5 milliseconds before it is recognized as a legitimate pulse, fine chatter such as from rapid relay contact vibration must be either taken into account or disregarded, and split pulses beyond the minimum must be either taken into account or disregarded.

In the prior art, such as U.S. Pat. No. 3,230,394 to Kintner of Jan. 18, 1966 and U.S. Pat. No. 3,452,220 to Fritschi of June 24, 1969 and the like, analog timing circuits are known to be capable of masking fine chatter, of bridging pulse splits, and of taking into account the nature and extent of fine chatter at pulse transitions. Such prior art falls into two general classes—the pulse corrector art and the pulse repeater art. The former provides specified output pulse conditions regardless of input pulse variations: the latter is concerned with reproducing and repeating input pulses as output pulses while retaining the essential character of the input.

In the areas of pulse correction and pulse repeating, the prior art has not provided the teaching of how to process random input pulses so as to repeat the input as clock-pulse-synchronized output pulses while retaining the essential character of the input pulses and while at the same time taking into account all of the significant input variations such as minimum recognizable pulse length, extent and nature of fine chatter, and occurrence of pulse splits beyond the minimum input pulse length. The present invention provides that teaching so that random input pulse data is made available in clock-pulse-synchronized form for use in clock controlled pulse processing circuitry.

SUMMARY OF THE INVENTION

The present invention contemplates a clock pulse counter for causing an output device to change state each time the counter counts a prescribed number of clock pulses, an input device controlled by input pulses to change state each time a change of input pulse level occurs, and control circuitry for (1) allowing the counter to count clock pulses when the input and output devices are in opposite states and (2) preventing the counter from counting clock pulses when he input and output devices are in the same state. A specific aspect of the invention contemplates a resettable counter and means for resetting the counter to zero count whenever the output device changes state. These arrangements accomplish clock pulse synchronism while denying recognition of an input change lasting less time than the prescribed number of clock pulses and while denying recognition of an input change with fine chatter unless the change, taking the chatter into account, persists in part or parts for an accumulation of time necessary to allow the prescribed number of clock pulses to be counted.

The present invention also contemplates, in cooperation with the above resettable counter arrangement, an input timer for monitoring the input and output devices and for resetting the counter to zero count whenever a prescribed time accumulates before the output device changes state in response to a change of state of the input device. This arrangement allows the disregard of an input pulse change lasting less time, taking fine chatter into account, than a prescribed minimum and permits clearing the counter of a partial clock pulse count accumulated during such an input change.

The present invention also contemplates, in cooperation with either of the above counter arrangements, an output timer responsive to changes of state of the output device to render the counter arrangement nonresponsive to subsequent input changes which might occur during a prescribed time. This arrangement allows a disregard of pulse splits occurring at the input after a minimum input change has been recognized.

BRIEF DESCRIPTION OF THE DRAWING

The drawing consists of FIGS. 1 through 25 arranged on four sheets as follows.

DETAILED DESCRIPTION

The detailed description of the exemplary embodiment is arranged in three main parts: the circuit Symbols; the Block Diagram; and, the Detailed Circuit Disclosure. These parts will be dealt with in the above order under the indicated headings.

CIRCUIT SYMBOLS

Figure 25:
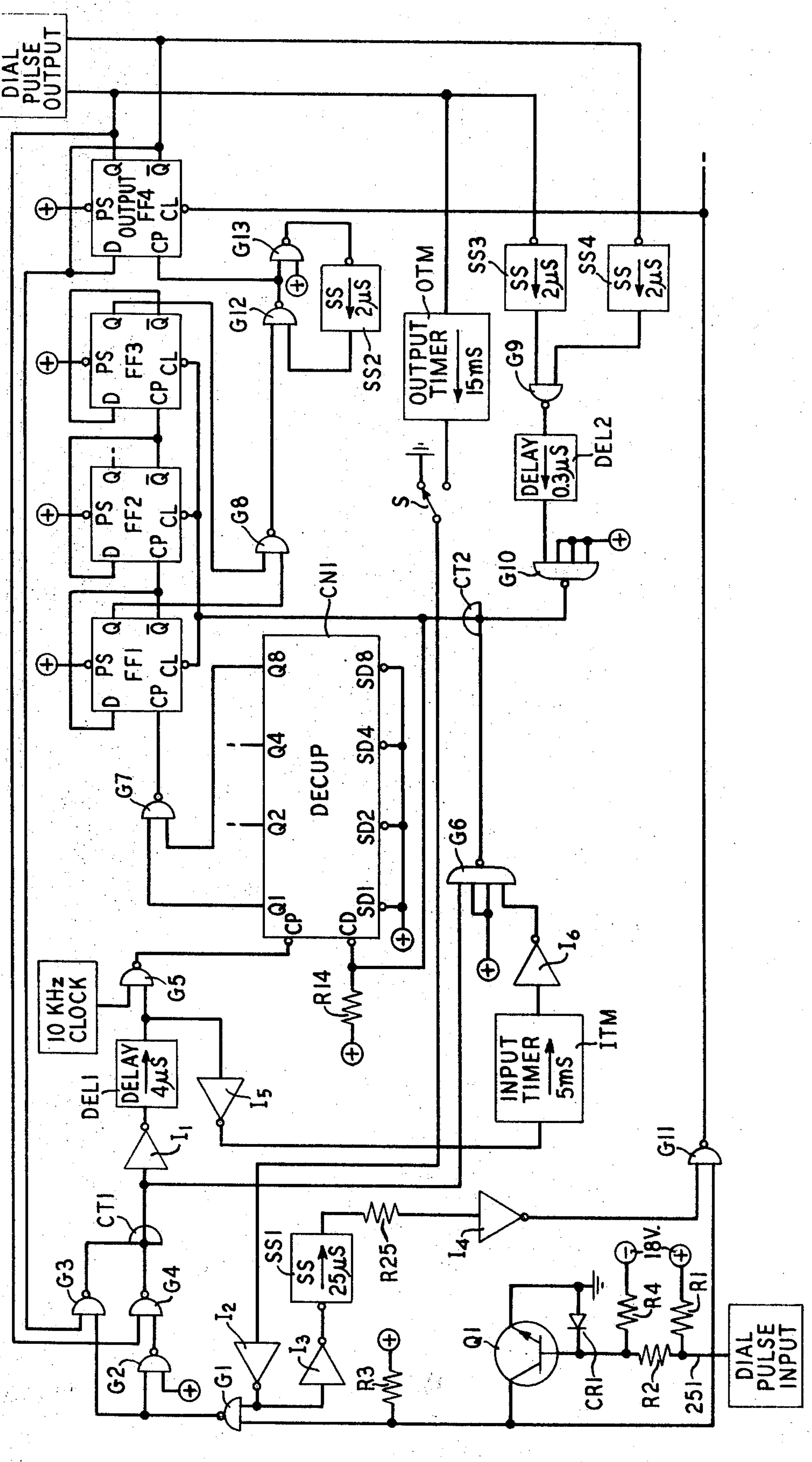

The following, under suitable headings, explain conventions and symbols as used in the detailed circuit layout of FIG. 25. In explaining the action of the circuit components, it is assumed that they are connected in the circuit as shown in FIG. 25. The diagrams used to show the action of the components are not intended to represent true waveforms, but merely to illustrate the logic level functions performed by the circuit components in the context of FIG. 25.

Battery and Ground

A circle with a plus sign (+) indicates the positive terminal of a source of direct current supply, the negative terminal of which is assumed to be connected to ground, which is considered as zero potential. The direct current voltage is 5 volts unless otherwise indicated.

High and Low Signals

Exclusive of the DIAL PULSE INPUT OF FIG. 25, a potential condition, whether steady or transient, is said to be a high logic level if it is 2 volts or more positive. A low logic level condition is a voltage not more positive than about one-half of a volt—nominally zero, or ground.

The output of the DIAL PULSE INPUT of FIG. 25 is high if it is 11 or more volts positive and is low if it is 3 or less volts positive: an open circuit from the DIAL PULSE INPUT of FIG. 25 is treated as a high condition to the circuit.

NAND Gate

Figure 5:
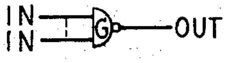

FIG. 5 shows the symbol for a typical NAND gate such as Motorola integrated circuit MC830 and the like.

Figure 6:
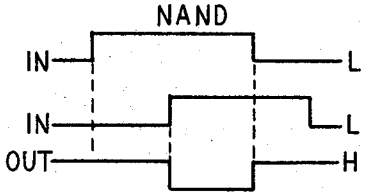

FIG. 6 shows the circuit action of the NAND gate. The output will be low only if all inputs are high: otherwise, the output will be high.

INVERTER

Figure 7:
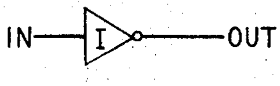

FIG. 7 shows the symbol for a typical inverter such as Motorola integrated circuit MC836 and the like.

Figure 8:
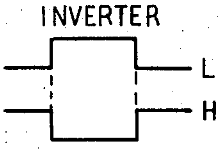

FIG. 8 shows the circuit action of the inverter. The output will be the inverse of the input. That is, a low input produces a high output and a high input produces a low output.

Logical AND

Figure 9:
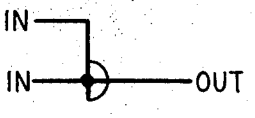

FIG. 9 shows the symbol used to indicate an electrical connection referred to as a "collector tie," which is the electrical paralleling of outputs from two or more NAND gates or inverters or both.

Figure 10:
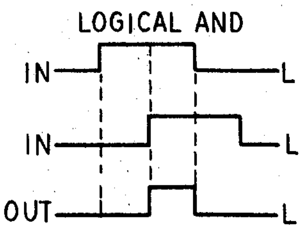

FIG. 10 shows the effect of the logical AND connection. The output is high only when all inputs are high: otherwise, the output is low.

Delay

Figure 11:
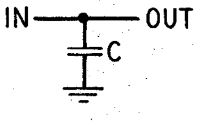

FIG. 11 shows how a capacitor can be connected to a conductor such that a delay is attached to each low-to-high transition. The amount of delay is a function of the value of the capacitor C and the amount and nature of connecting circuits.

Figure 12:

FIG. 12 shows the symbol for a delay circuit with an arrow pointing in the direction of the effect of the delay. The symbol includes the amount of delay (microseconds, $\mu$sec., or milliseconds, msec.) where pertinent.

Figure 13:
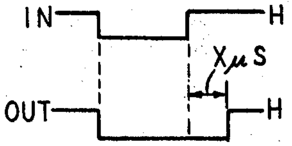

FIG. 13 shows the action of the delay circuit. A low-to-high transition at the input is delayed by $x$ $\mu$sec. at the output due to a controllable charging time of capacitor C. No delay to speak of is experienced at he output by a high-to-low transition at the input since the discharge path of capacitor C is arranged to be very fast.

Single-Shot

Figure 14:
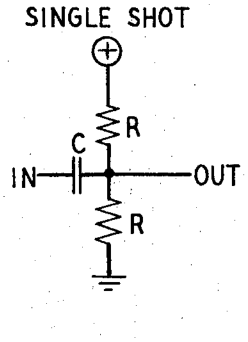

FIG. 14 shows how a single-shot circuit may be made to produce a high-to-low output of a specified short width from a longer high-to-low input.

Figure 15:
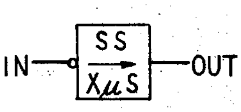

FIG. 15 shows the symbol for a single-shot circuit like FIG. 14.

Figure 16:
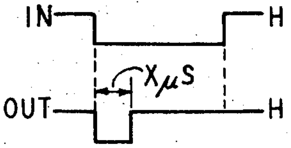

FIG. 16 shows the circuit action of the single-shot. A high-to-low transition at the input will produce at the output a high-to-low transition lasting for $x$ $\mu$sec. Normally, the output is high by virtue of the resistance divider. Low-to-high transitions at the input will not affect the output. However, a high-to-low transition of the input will at once provide a high-to-low transition at the output, followed by a charging time of $x$ $\mu$sec, for capacitor C to charge up to the high level.

D-type Flip-Flop

Figure 17:
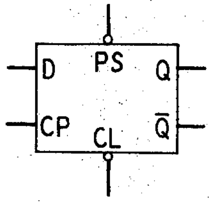

FIG. 17 shows a typical D-type flip-flop such as Texas Instruments integrated circuit SN7474 and the like. D is the data input, CP is the clock pulse input, PS is the preset input, CL is the clear input, Q is the "1" output, and $\bar{Q}$ is the "o" output. With PS low and CL high, a preset condition exists with Q high and $\bar{Q}$ low. With PS high and CL low, a clear condition exists with Q low and $\bar{Q}$ high. With PS high and CL high, Q is made the same as the high or low condition of the D input when CP is pulsed low-to-high. At all other times, Q and $\bar{Q}$ are unaffected by changes on the D input. The following table summarizes the above:

| CP | D | PS | CL | Q | $\bar{Q}$ |
|---|---|---|---|---|---|
| X | X | L | H | H | L |
| X | X | H | L | L | H |
| P | L | H | H | L | H |
| P | H | H | H | H | L |

P—means a pulse from low-to-high
L—means low
H—means high
X—means not controlling.

Decade Up Counter

Figure 18:
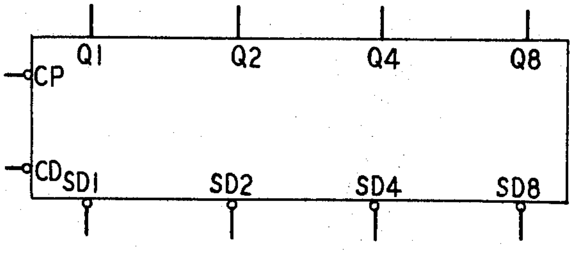

FIG. 18 shows a typical binary coded decimal counter such as Motorola integrated circuit MC838 and the like. With all SD inputs high and with input CD pulsed high-to-low, the counter goes to state zero (0000) with Q1, Q2, Q4 and Q8 each low. With the CD input high, any of the SD inputs being pulsed high-to-low will set the corresponding Q1, Q2, Q4 or Q8 high. With input CD high and all SD inputs high, the internal circuitry is arranged so that the counter will progress through 10 decimal counts and repeat as long as the clock pulse lead CP is pulsed (P) negatively (high-to-low). The following table shows the action of the counter.

| | | | 1 | 2 | 4 | 8 | |
|---|---|---|---|---|---|---|---|
| CD | SD | CP | Q1 | Q2 | Q4 | Q8 | Decimal count |
| H | H | P | L | L | L | L | 0 |
| H | H | P | H | L | L | L | 1 |
| H | H | P | L | H | L | L | 2 |
| H | H | P | H | H | L | L | 3 |
| H | H | P | L | L | H | L | 4 |
| H | H | P | H | L | H | L | 5 |
| H | H | P | L | H | H | L | 6 |
| H | H | P | H | H | H | L | 7 |
| H | H | P | L | L | L | H | 8 |
| H | H | P | H | L | L | H | 9 |
| H | H | P | L | L | L | L | 0(10) |
| H | H | P | H | L | L | L | 1 |

Etc.

Input Timer

Figure 19:
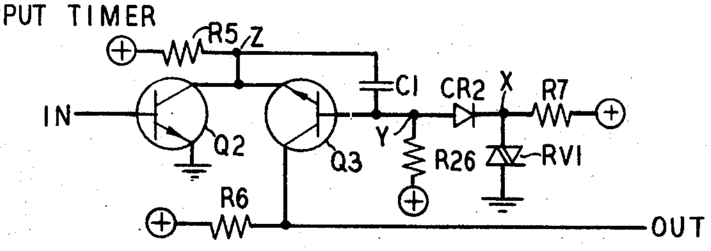
Figure 20:
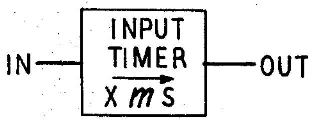
Figure 21:
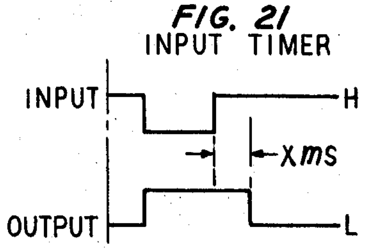

FIG. 19 shows the circuitry of the INPUT TIMER for which FIG. 20 is the symbol. While the timer has some variations, FIG. 21 shows the significant action of the circuit in the context of the detailed circuit of FIG. 25. When the input goes from a steady high to a steady low, the output goes at once from low to a steady high. When the input goes from a steady low to a steady high, the output goes from high to a steady low after a delay of $x$ $\mu$sec.

With a steady low (such as ground) on the input, Q2 is cut off since the base-emitter junction is back biased (ground on base and ground on emitter). The collector of Q2 (point Z) is thus at about +5.0 volts through R5. Current flow from ground, through varistor RV1 and R7 to battery produces about +0.7 volts at point X. The circuit from battery, through R26 and diode CR2 to point X produces about +1.4 volts at point Y since the forward biased diode CR2 has about a 0.7 volt drop as does varistor RV1. With the base of Q3 (point Y) at about +1.4 volts and the collector of Q3 (point Z) at about +5.0 volts, Q3 is cut off due to this back-biasing of the base-emitter junction. Under these circumstances, capacitor C1 is charged to about 3.6 volts (point Z about +5.0 volts and point Y about +104 volts). volts). With Q3 cut off, the output is high (about 5.0 volts through R6).

With a steady high on the input, Q2 is turned on in a saturated condition since the base-emitter junction is forward-biased. The collector of Q2 (point Z) will be essentially at ground potential. With the emitter of Q3 (point Z) at about ground potential, base drive through R26 will have caused Q3 to turn on in a saturated condition with the base at about +0.7 volts. Since both sides of diode CR2 (points X and Y) are at about the same potential (+0.7 volts), CR2 appears like a high impedance since it is not forward-biased (same effect as being back-biased). The output from the collector of Q3 is low with point Z at ground (zero) and point Y at about +0.7 volts. Capacitor C1 is thus essentially discharged.

A transition at the input from steady high to steady low turns off Q2 at once. Capacitor C1 starts to acquire a charge toward +5.0 volts through R5; as a consequence, Q3 cuts off at once since the base-emitter voltage on Q3 decreases and reverses polarity to back-bias Q3. Diode CR2 becomes forward-biased through R26 and RV1 to reference point Y at about +1.4 volts. Capacitor C1 continues to acquire a charge through R5, CR2 and RV1 to end up with about a 3.6 volt charge (+5.0 volts on point Z and +1.4 volts on point Y). The output goes high through R6 at once when Q3 cuts off as soon as Q2 cuts off at the high-to-low input transition. The time required for capacitor C1 to acquire a full charge is about 5 msec.: point Z will start at about 0 volts (ground), jump to about +0.7 volts, and then gradually charge up to about +5.0 volts.

A transition at the input from steady low to steady high turns on Q2 at once. Consequently, point Z will drop sharply from about +5.0 volts to about 0 volts (ground). This 5 volt drop on point Z causes point Y to drop sharply the same amount (from about +1.4 volts to about −3.6 volts) through capacitor C1. With point Z at ground (0 volts) and point Y at −3.6 volts, Q3 is back-biased and thus remains cut off to hold the output high through R6. At the same time, diode CR2 is back-biased (+0.7 volts at point X and −3.6 volts at point Y). Capacitor C1 will start to discharge, carrying point Y from −3.6 volts toward the +5.0 volts through R26. However, when point Y reaches about +0.7 volts, Q3 will become forward-biased and will turn on, thus causing the output to go low. The delay in the turn-on of Q3 after the turn-on of Q2 is about 5 msec.

To summarize, from steady state conditions lasting at least 5 msec., the following circuit action takes place:

1. input high-to-low ... Q2 turns off at once ... Q3 turns off at once ... output goes low-to-high at once ... capacitor C1 takes about 5 msec. to acquire a full charge.
2. input low-to-high ... Q2 turns on at once ... capacitor C1 takes about 5 msec. to discharge to the point where Q3 can turn on ... then Q3 turns on to cause the output to go high-to-low after a 5 msec. delay from the turn on of Q2.

Figure 3:
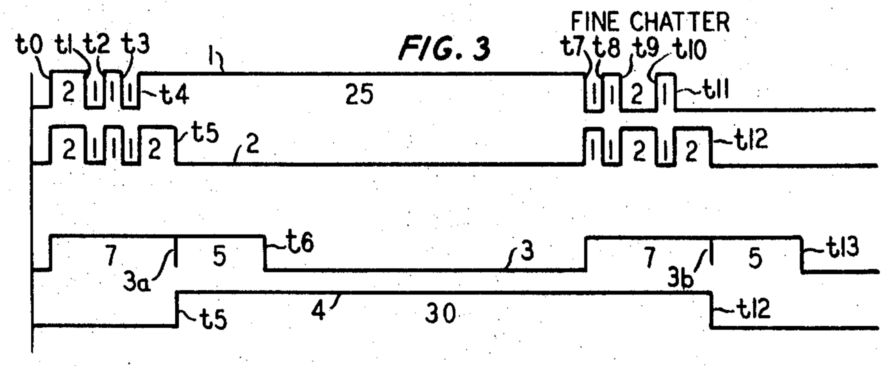

If a transition (low-to-high or high-to-low) at the input does not last long enough for the timer to arrive at one of its steady state conditions, capacitor C1 will either not fully charge (high-to-low input) or not fully discharge (low-to-high input). Qualitatively speaking, if the input receives a series of short (in the order of 1 msec. or 2 msec.) pulses with lows and highs alternating, capacitor C1 will partially charge or discharge alternately to about the same extent to in effect disregard such a succession of short pulses insofar as its 5 msec. timing is concerned. This is of some consequence, as will be seen later, when the input timer must function in the presence of fine chatter at the leading or trailing edges of otherwise fairly long pulses, as illustrated in FIG. 3.

Output Timer

Figure 22:
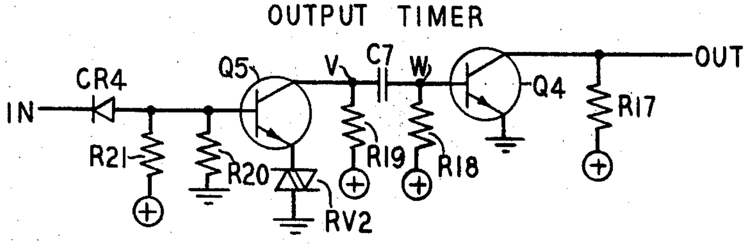
Figure 23:
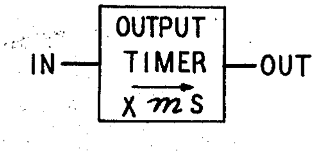
Figure 24:
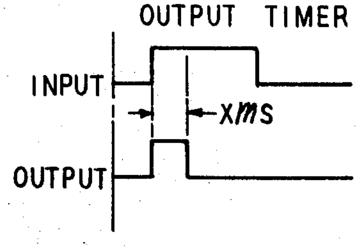

FIG. 22 shows the circuitry of the OUTPUT TIMER for which FIG. 23 is the symbol. FIG. 24 shows the significant action of the circuit. When the input goes from steady low to steady high, the output goes at once from steady low to steady high but returns to steady low after a delay of $x$ msec.

With a steady low input, diode CR4 is forward-biased through R21 to hold the base of Q5 at about +0.7 volts, which prevents the base-emitter junction of Q5 from becoming forward biased, thus to cause Q5 to be turned off. R20 helps to maintain Q5 cut off by referencing the base to ground so as to minimize the Q5 collector leakage current. The collector of the cut off Q5 is high (about +5.0 volts) through R19. Q4 is turned on in a saturated condition by base drive from R18. Capacitor C7 is charged to about 4.3 volts (point V about +5.0 volts and point W about +0.7 volts). The collector of Q4 is held nearly at ground, thus making the output low.

With a steady state high input (or an open input) Q5 is turned on in a saturated condition due to base drive supplied by R21: the diode CR4, for a high input, is back-biased; the base of Q5 is about +1.4 volts; the emitter of Q5 is about +0.7 volts; and, the collector (point V) of Q5 is about +0.7 volts. Q4 is turned on in a saturated condition by base drive from R18 with the base of Q4 (point W) at about +0.7 volts. Capacitor C7 is discharged with points V and W both at about +0.7 volts. The collector of Q4 is held nearly at ground, thus making the output low.

A high-to-low transition at the input cuts off Q5. The point W is clamped at +0.7 volts through the base-emitter circuit of the saturated Q4. Point V will charge toward +5.0 volts through R19 due to the cutoff of Q5. Capacitor C7 acquires a charge in about 8 msec. to end up with point W at about +0.7 volts and point V at about +5.0 volts, the base-emitter circuit of the conducting Q4 supplying the ground return for the charging path. Q4 remains on to keep the output from changing (still low).

A low-to-high transition at the input causes Q5 to turn-on at once in a saturated condition to drop the point V to about +0.7 volts. The approximate 4.3 volt swing at point V causes point W to drop from +0.7 volts to about −3.6 volts to back-bias the base-emitter of Q4. This turns off Q4 at once to cause the output to go at once from low-to-high. The capacitor C7 begins to discharge through R18 and the collector circuit of Q5. The point W will start discharging from −4.3 volts toward the +5.0 volts supplied through R18. However, when point W reaches about +0.7 volts (about 15 msec.), Q4 will turn on due to the forward-bias of its base-emitter circuit. The turning on of Q4 clamps the point W to about +0.7 and causes the output to go from high-to-low.

In the event that high-to-low and low-to-high input transitions occur faster than the 8 msec. charging time of C7 (on a high-to-low input transition) or faster than the 15 msec. discharge time of C7 (on a low-to-high input transition), capacitor C7 either will not acquire a full (about 5 volts) charge or will not discharge enough to turn on Q4, or both. The parameters of the circuit may obviously be changed to suit any desired timing purpose. In the detailed circuit disclosure to be described, the 8 msec. charging time of C7 and its 15 msec. discharge time are satisfactory for the type of exemplary control used.

Block Diagram

Figure 1:
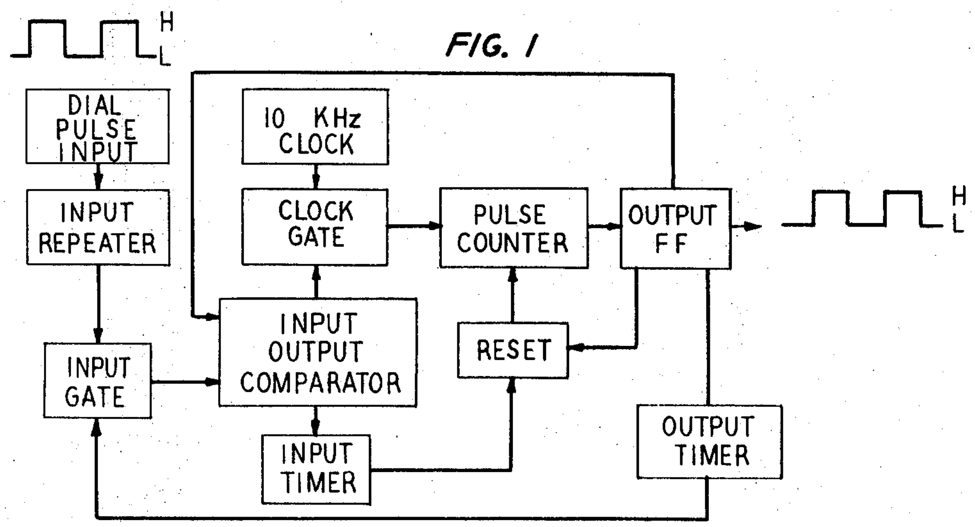
FIG. 1 is a block diagram showing the main functional parts of the detailed circuit disclosure of FIG. 25.

In FIG. 1 input pulses are shown in the upper left corner as provided from the DIAL PULSE INPUT. These pulses are random and have highs and lows. At the right in FIG. 1 are shown output pulses from the OUTPUT flip-flop (FF). Each output pulse is a replica of each input pulse except that the transitions (high-to-low and low-to-high) are synchronized with the 10KHz. CLOCK.

The INPUT REPEATER passes input pulse transitions to the INPUT GATE, which in turn, except as controlled by the OUTPUT TIMER, provides to the INPUT OUTPUT COMPARATOR signals as to the state of the input pulses (high, low, etc.).

The 10KHz. CLOCK is applied to the CLOCK GATE, which is controlled by the COMPARATOR, which compares the state of the input to the state of the output.

When the input and output states are the same the COMPARATOR disables the CLOCK GATE to prevent 10KHz. clock pulses from being applied to the COUNTER. When the input and output states are different (one high – one low), the COMPARATOR enables the CLOCK GATE to allow 10KHz. clock pulses to be applied to the COUNTER.

The INPUT TIMER starts timing for a 5 millisecond (5 msec.) interval whenever the input and output states are the same (high or low) and, upon timing out, resets the COUNTER to zero count, or keeps it there if it has been reset beforehand.

The COUNTER is arranged to count 10kHz. clock pulses until a count of 50 is attained, which represents 5 msec. of time. Each time the COUNTER arrives at the count of 50 clock pulses, it toggles the output FF (changes it from low-to-high or from high-to-low and resets itself to zero count. At each input transition (low-to-high or high-to-low), the COMPARATOR allows the CLOCK GATE to apply clock pulses to the COUNTER since at that time the input will change to the opposite of the output. After the 5 msec. count time, the output FF will be toggled to repeat the input transition (output will become the same as the input) after a 5 msec. delay; and, the toggled output FF will reset the COUNTER. Also, at the time the output becomes the same as the input, the COMPARATOR starts the INPUT TIMER, which upon timeout (5 msec.) will apply a reset signal to the counter. Each input transition is operated on in the same fashion such that the input transitions are repeated at the output delayed 5 msec.

Figure 2:
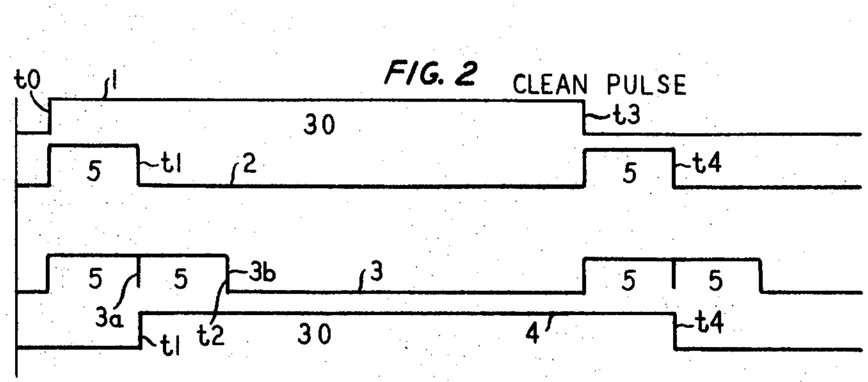
FIGS. 2, 3 and 4 are diagrams illustrating the action of the circuit in dealing with clean pulses, fine chatter and split pulses, etc.; and, FIGS. 5 through 24 show various component circuits and their symbols as used in the detailed circuit disclosure of FIG. 25.

FIG. 2 shows the action of the circuit in response to clean input pulses. Line 1 of FIG. 2 shows an input high pulse of 30 msec. duration extending from $t_0$ to $t_3$. Line 4 shows the repeated output high pulse of 30 msec. duration extending from $t_1$ to $t_4$, where the time from $t_0$ to $t_1$ is 5 msec. intervals from $t_0$and from $t_3$ to $t_4$ during which the input and output states are different and the interval $t_1$ to $t_3$ during which the input and output states are the same. At time $t_1$ in line 2, the COUNTER arrives at the count of 50 (5 msec.), toggles the OUTPUT FF to make the output the same as the input (line 4), and resets itself (the spike 3$a$ in line 3). At time $t_1$, when the output (line 4) becomes the same as the input (line 1), the INPUT TIMER starts its 5 msec. timeout interval (from $t_1$ to $t_2$ of line 3), at the end of which (time $t_2$) it applies another reset signal (edge *3b* in line 3) to the COUNTER.

If the input pulse (line 1) lasts for less than 5msec., the COUNTER will never reach the 5msec. count (50 pulses from 10KHz. clock) and the output (line 4) will not change. Under these circumstances, the INPUT TIMER will start its 5msec. timeout as soon as the input returns to its original condition (same as output). When the INPUT TIMER times out, it will reset the COUNTER to zero to eliminate the partial count due to the short input pulse.

FIG. 3 shows the effect of fine chatter at the leading edge $t_0$ and trailing edge $t_7$ of an input pulse (line 1). The input pulse (line 1) consumes 30 msec. from $t_0$ to $t_7$ but the leading edge contains two periods of fine chatter ($t_1$—$t_2$ and $t_3$—$t_4$) and the trailing edge contains two periods of fine chatter ($t_8$—$t_9$ and $t_{10}$—$t_{11}$). In line 2, the COUNTER will still count to 50 clock pulses (5 ms) but only during the leading edge highs ($t_0$—$t_1$, $t_2$—$t_3$ and $t_4$—$t_5$) and only during the trailing edge lows ($t_7$—$t_8$, $t_9$—$t_{10}$ and $t_{11}$—$t_{12}$). This masks the fine chatter at each transition but takes the chatter into account by not timing (counting clock pulses) during the chatter transitions. As a result, the COUNTER will not arrive at its 5 msec. count (50 clock pulses) until more than 5 msec. has elapsed from $t_0$ to $t_5$ and $t_7$ to $t_{12}$. This time, by example, might be 7 msec. as shown in FIG. 3. The spikes *3a* and *3b* in line 3 shows where the COUNTER resets itself at times $t_5$ and $t_{12}$. The INPUT TIMER again functions from $t_5$ to $t_6$ and from $t_{12}$ to $t_{13}$. The output (line 4) is a replica of the 30 msec. input delayed 7 msec. on each edge. In the example of input fine chatter shown in FIG. 3, it so happens that the amount of fine chatter at the leading edge ($t_1$—$t_2$ and $t_3$—$t_4$) and the amount of fine chatter at the trailing edge ($t_8$—$t_9$ and $t_{10}$—$t_{11}$) are both 2 msec. These times may differ slightly and the number of specific items of chatter may differ; and, the clean output pulse (line 4) will thus be slightly longer or slightly shorter than the input pulse depending upon the extent to which the leading and trailing edge chatter characteristics differ. The output (line 4), however, is still essentially a replica of the input while masking the fine chatter but taking it into account.

Figure 4:
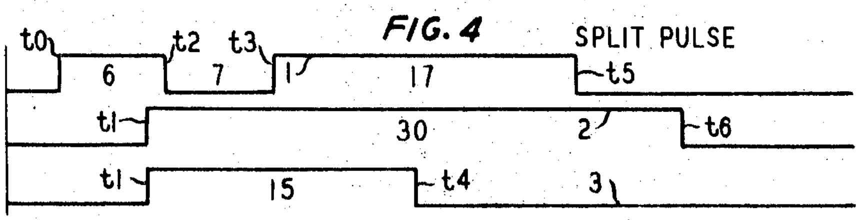

FIG. 4 illustrates how the OUTPUT TIMER bridges input pulse splits. The input pulse (line 1) persists for 6 msec.—long enough to cause the COUNTER to reach a count of 50 (5 msec.) to in turn toggle the OUTPUT FF (time $t_1$) and reset itself. The circuitry makes the assumption that if the pulse lasts for at least 5 msec. it is a legitimate signal. However, some pulsing situations may cause severe "bounce" at the input such as to cause a pulse "split," such as from $t_2$ to $t_3$ in line 1. The OUTPUT TIMER is rendered effective at $t_1$ for a timeout interval of 15 msec. during which time ($T_1$ to $t_4$ of line 3) any change of the input, such as the split from $t_2$ to $t_3$ of line 1, is masked so that the split cannot effect the circuit. Assuming, as shown in line 1, that the input pulse lasts for 30 msec. (including the 7 msec. split), the output (line 2) will be a 30 msec replica delayed 5 msec. with the split masked. In order that the OUTPUT TIMER does not perform a "pulse correction" function any more than necessary, the circuit is arranged such that if the input (line 1) has returned to its original condition by the time the OUTPUT TIMER times out, the output (line 2) will at once (time $t_4$) be made the same as the input.

Detailed Circuit Disclosure

With reference to the detailed circuit disclosure of FIG. 25, the following description will proceed with a discussion of the action of the circuit responsive to a clean pulse input like FIG. 2, followed by description of the ramifications involved when dealing with fine chatter (FIG. 3) and pulse splits (FIG. 4).

In FIG. 25, switch S is assumed to be in the position shown, with its swinger grounded, such that the output timer is not involved in the circuit functioning: inverter I2 thus makes the right input to gate G1 high. Since the output of I2 remains high, there will be no pulsing through I3 and single-shot SS1: thus, the upper input to gate G11 will remain low from I4, the input to which is held high from SS1.

Starting Conditions

During the operation of the circuit with dial pulses being supplied from the DIAL PULSE INPUT in FIG. 25, the dial pulses incoming to the circuit will have transitions from low-to-high and from high-to-low with the highs and lows prevailing for some length of time. For instance, for a nominal "dialing" speed of 10 pulses per second (p.p.s.) with a percent break OF 60 percent, the total pulse period would be 100 msec., the make (off-hook) intervals would be 40 msec., and the break (on hook) intervals would be 60 msec. In the diagram of FIGS. 2, 3 and 4, the break intervals are high and the make intervals are low.

Assuming, for a series of input pulses being repeated at the output, that as a starting condition the input and output are both low (off-hook, low make interval), the following circuit conditions prevail:

1. the output flip-flop FF4 is in its cleared condition (Q low—$\bar{Q}$ high).
2. counter CN 1 is set to zero (0000) with its Q1 and Q8 outputs low.
3. flip-flops FF1, FF2 and FF3 are cleared with their $\bar{Q}$ outputs low and their Q outputs high.
4. input timer ITM is providing a low output.
5. clock gate G5 is disabled to prevent clock pulses (10KHz. from being applied to counter CN1.

Since the assumption is that the output from the circuit into the DIAL PULSE OUTPUT is low, the output FF4 is assumed to be in its cleared condition with its Q output low and its $\bar{Q}$ output high. The assumption is also that the input on lead 251 from the DIAL PULSE INPUT is low. These assumptions go on the premise that the circuit has been in operation repeating pulses. Later, the situation will be discussed regarding what might happen when the circuit is first energized.

With respect to counter CN1, with all of its SD inputs permanently high, a low on its CD input will clear counter CN1 to a count of zero (0000) with its Q1 and Q8 outputs low. Also, with respect to flip-flops FF1, FF2 and FF3, with their PS inputs permanently high, lows on their clear inputs $\overline{CL}$ will set them to their cleared conditions (Q outputs low—$\bar{Q}$ outputs high). The low input on lead 251 turns off Q1 to cause the left input to gate G1 to be high from the high collector of Q1. The right input to gate G1 is high from I2 whose input is held low to ground over switch S. The resulting low output from gate G1 holds low the upper input to gate G2 and the lower input to gate G3. Since the lower input to gate G2 is permanently high, the output of gate G2 will be high at the lower input to gate G4. Since the upper input to gate G4 is low from the low Q output of FF4, the output of G4 is high at the lower input to collector tie CT1. Since the upper input of gate G3 is high from the high $\bar{Q}$ output of FF4, the low input to gate G3 from gate G1 makes the output of gate G3 high at the upper input to collector tie CT1. Since both inputs to collector tie CT1 are high, its output is high at the input to I1 and at the upper input to gate G6. Since the input to I1 is high, its output is low, thus making low the output of delay DEL1 at the lower input to gate G5 to block the passage through gate G5 of clock pulses (10KHz.) to the CP input of counter CN1, which CP input is held high from the output of gate G5. The low output of DEL1 is made high by I5 at the input to timer ITM, which provides a low output to 16, which provides a high output to the lower input to gate G6. Since both upper and lower inputs to gate G6 are high (middle two inputs permanently high), the output of gate G6 is low to the left input of collector tie CT2. The outputs of single-shots SS3 and SS4 are high, thus making the output of gate G9 low, to in turn cause the output of delay DEL2 to be low at the upper input to gate G10. With all the lower inputs to gate G10 permanently high, the low on its upper input causes its output to be high at the lower input to collector tie CT2. Since one of the inputs (left) to collector tie is low, the output is low at the CD input to counter CN1 and at the CL inputs to FF1, FF2 and FF3. This clears counter CN1 to zero (0000—Q AND Q8 low) and clears FF1, FF2, and FF3 (Q outputs low—$\overline{Q}$ outputs high).

It will be observed, with regard to gates G2, G3 and G4 and collector tie CT1, that if the input (lead 251) and the output (FF4) are the same (both high or both low), then the output of collector tie CT1 will be high. On the other hand, if the input and output are in different states (one high, one low), then the output of collector tie will be low. A change of input or output from the same state condition to the different state condition will provide a high-to-low transition at the output of CT1; whereas, a change of input or output from the different state condition to the same state condition will provide a low-to-high transition at the output of CT1.

Since the exemplary circuit is adapted primarily to repeat telephone dial pulses, the description will assume a nominal dial input speed of 10 p.p.s. with break internals of 60 msec. and make intervals of 40 msec. The input timer ITM has a nominal 5 msec. timing characteristic; and, the output timer OTM has a nominal 15 msec. timing characteristic. It will be apparent that these and other timing features may vary depending on the type of input and the desired degree and nature of control exercised over the repeating operation.

Low-to-High Input Transition

The following will assume that the input (lead 251) goes from low-to-high to represent the transition from an off-hook make (low) to an on-hook break (high) and that the break will remain high for 60 msec. without chatter or split conditions (a clean pulse like FIG. 2).

At the leading edge of the high break the following circuit functions occur:

1. Q1 turns on to produce a high-to-low change at the output of the collector tie CT1.
2. counter CN1 and flip-flops FF1, FF2 and FF3 are enabled to respond to pulses on their CP inputs.
3. clock pulses (10KHz. are fed to the CP input of counter CN1.

The high input on lead 251 causes Q1 to turn on to make the left input to gate G1 low. The output of gate G1 thus becomes high to cause the outputs of gate G3 and collector tie CT1 to become low. The low at the output of collector tie CT1 is applied to the upper input to gate G6, which produces a high at its output to in turn change the output of collector tie CT2 to high. The high output of CT2 is applied to the CD input to counter CN1 and to the clear inputs CL of flip-flops FF1, FF2 and FF3 to render the counter CN1 responsive to high-to-low pulses at its CP input and to render FF1, FF2 and FF3 responsive to low-to-high pulses at their CP inputs.

When the output of collector tie CT1 goes low, the output of I1 provides a low-to-high transition at the input to delay DEL1, the output of which will go from low to high after a delay of about 4$\mu$sec. The high output of DEL1 extends through I5 as a high-to-low change at the input to timer ITM, whose output at once goes high at the input to I6: I6 produces a low output to the lower input to gate G6 to hold the output of gate G6 high until both of the upper and lower inputs to gate G6 again go high.

The high output of DEL1 enables gate G5 to pass low-to-high clock pulse transitions to the CP input to counter CN1 as high-to-low transitions. The 10 KHz. clock is arranged to provide a pulse period (100 $\mu$sec.) made up of a 1 $\mu$sec. high interval and a 99 $\mu$sec. low interval.

During High Input

Counter CN1 will count the high-to-low clock pulses at its CP input so as to advance from its initial count of zero (Q1 low and Q8 low) to 1, 2, 3, 4, 5, 6, 7, 8, 9, 0, 1, 2, etc. as long as gate G5 is enabled. The first time in that sequence of decimal counts that outputs Q1 and Q8 of counter CN1 both become high is at the count 9. When counter CN1 arrives at the count of 9 with its outputs Q1 and Q8 both high, the output of gate G7 goes low. When counter CN1 goes from the count of 9 to the count of 0 (10th clock pulse count), both outputs Q1 and Q8 go low to produce a low-to-high output transition from gate G7 at the Cp input to FF1. This high pulse at the CP input to FF1 sets it to its one state (Q high—$\overline{Q}$ low) to record a count of 10 clock pulses. The low $\overline{Q}$ output of FF1 makes the CP input to FF2 low. When counter CN1 counts the 20th clock pulse, it will again go from a count 9 to a count of zero to again toggle FF1 back to its zero state (Q low—$\overline{Q}$ high). The low-to-high change at the $\overline{Q}$ output of FF1 toggles FF2 to its one state ($\overline{Q}$ low). The 30th clock pulse count in counter CN1 (a) returns counter CN1 from 9 to 0 and (b) toggles FF1 from its zero state (Q low—$\overline{Q}$ high) to its one state Q high—$\overline{Q}$ low). The 40th clock pulse count in counter CN1 (a) returns counter CN1 from 9 and 0 and (b) toggles FF1 from its one state (Q high—$\overline{Q}$ low) to its zero state (Q low—$\overline{Q}$ high). The low-to-high change at the $\overline{Q}$ output of FF1 toggles FF2 from its one state ($\overline{Q}$ low) to its zero state (Q high). The low-to-high change at the $\overline{Q}$ output of FF2 toggles FF3 from its zero state (Q low—$\overline{Q}$ high) to its one state (Q high—Q low).

All during the above count of the first 40 clock pulses by counter CN1 and flip-flops FF1, FF2 and FF3, the two inputs to gate G8 will never both be high at the same time; thus, the output of gate G8 is kept high.

When counter CN1 has counted the 49th clock pulse, it will be at 9 with FF1 and FF2 in their zero states (Q outputs low—$\overline{Q}$ outputs high) and with FF3 in its one state Q high—$\overline{Q}$ low).

Upon the 50th clock pulse count, counter CN1 goes from 9 to 0 to toggle FF1 to its one state (Q high—$\overline{Q}$ low). At this time both inputs to gate G8 are high from the high Q outputs of FF1 and FF3. The resulting high-to-low transition at the output of gate G8 causes the output of gate G12 to produce a low-to-high transition, since the lower input to gate G12 is high from single-shot SS2. The high at the output of gate G12 is applied to the CP input of FF4 to toggle it from its zero state (Q low—$\overline{Q}$ high), which was a low make output, to its one state (Q high—$\overline{Q}$ low), which is a high break output. Gate G13 provides a high-to-low output (in response to the high from gate G12) to cause single-shot SS2 to provide a high-to-low output lasting for 2 $\mu$sec. to in turn keep the output of gate G12 high for at least 2 $\mu$sec. During that 2 $\mu$sec., interval, the output of gate G12 is maintained high to insure a response by FF4.

When the flip-flop FF4 toggles to its one state (Q high—$\overline{Q}$ low), the clock gate G5 is disabled from passing further clock pulses to counter CN1. The low $\overline{Q}$ output of FF4 causes the output of G3 to go high to in turn cause the output of collector tie CT1 to go high. The high output of CT1 produces a low at the output of I1, which is effective at once through DEL1 to disable gate G5 and produce a high at the CP input to counter CN1.

At the time that FF4 toggles to its one state (Q high—$\overline{Q}$ low) the high-to-low transition at its $\overline{Q}$ output energizes single-shot SS4 to produce a 2 $\mu$sec. low at the lower input to gate G9, the resulting 2 $\mu$sec. high output of which is delayed 0.3 $\mu$sec. in DEL2 and applied as a 107 $\mu$sec. high to the upper input to gate G10. The resulting 1.7 $\mu$sec. low output of gate G10 causes the output of collector tie CT2 to go low for 1.7 $\mu$sec. to reset counter CN1 and flip-flops FF1, FF2 and FF3-—counter CN1 to a count of zero and FF1, FF2, and FF3 to their zero states (Q outputs low—$\overline{Q}$ outputs high).

When the delayed 1.7 $\mu$sec. low clear pulse expires at the output of collector tie CT2, and when the 2 $\mu$sec. low output from single-shot SS2 expires, and when the 4 $\mu$sec. low at the lower input to gate G5 prevails, the following circuit situation will exist:

1. counter CN1 is reset to zero and does not count further clock pulses.
2. the output of collector tie CT2 has returned to high.
3. FF1, FF2, and FF3 are reset to their zero states (Q low—$\overline{Q}$ high).
4. output FF4 has changed from its zero state (Q low—$\overline{Q}$ high) to its one state (Q high—$\overline{Q}$ low) to provide a low-to-high make-to-break output transition 5 msec. (50 clock pulses) after the low-to-high make-to-break transition from the input on lead 251.

When the output of the collector tie CT1 changed from low-to-high (when FF4 was toggled), the upper input to gate G6 was made high. However, the output of gate G6 remains high due to a low on its lower input.

When the output of DEL1 went from high-to-low upon the change of the output FF4, I5 passed a low-to-high transition to input timer ITM. Some 5 msec. after the low-to-high change at the input to timer ITM, its output changes from high-to-low. This low output of ITM produces a high output from I6 to cause the output of gate G6 to go low. The low output from gate G6 causes the output of collector tie CT2 to go low to place a direct clear on the CD input to counter CN1 and on the CL inputs of FF1, FF2 and FF3. As will be mentioned later, this direct clear low from CT2 is useful in clearing the counter CN1 and the flip-flops FF1, FF2 and FF3 of a partial clock pulse count (less than 50) if such should occur.

The circuit stays in the above condition until the input exhibits a change from high-to-low on lead 251 at the end of the break interval, which, as above assumed, lasts for 60 msec. The net effect of the circuit action so far has been to repeat the first input transition (low-to-high) at the output (low-to-high) in synchronism with the 10KHz. clock but delayed 5 msec. (50 clock pulse counts).

High-to-Low Input Transition

Eventually (recalling the assumption of a 60 msec. high break input), the input on lead 251 will exhibit a high-to-low transition, such as the end of the 60 msec. high break (on-hook) and the beginning of a 40 msec. low make (off-hook) during telephone dial pulsing at 10 p.p.s.

The high-to-low transition on lead 251 will cause the following circuit functions:

1. the low clear will be removed from the output of collector tie CT2 to allow counter CN1 and flip-flops FF1, FF2 and FF3 to count clock pulses.
2. gate G5 is enabled to pass 10KHz. clock pulses to counter CN1.
3. input timer ITM is recycled with a steady low input and a steady high output.
4. the output FF4 stays in state one (Q high—$\bar{Q}$ low) to maintain the high break (on-hook) output.

The high-to-low change from the input on lead 251 turns off Q1 to produce a high at the left input to gate G1, whose output thereupon goes low. Since the output FF4 is still in state one (Q high—$\bar{Q}$ low), the output and input are at different states (input low - output high), thus making the output of collector tie CT1 go from high to low. The low output of CT1 causes the output of gate G6 to go high to in turn cause the output of collector tie CT2 to go high to remove the direct clear (low) from counter CN1 and flip-flops FF1, FF2 and FF3.

The low from collector tie CT1 produces a high output from I1 which is reflected at the output of DEL1 as a low-to-high transition 4 $\mu$sec. later. This enables gate G5 to pass 10KHz. clock pulses as high-to-low pulses to the CP input of counter CN1, whereupon counter CN1 begins again to count clock pulses, and to control FF1, FF2 and FF3 as previously described.

The low-to-high transition at the output of DEL1 is effective through I5 as a high-to-low change at the input to timer ITM. Timer ITM causes its output to go from low to high at once and to remain there. The high output of ITM is effective as a low output from I6 to keep the output of G6 high.

The circuit stays in the present condition while 49 clock pulses are counted by counter CN1, at which point counter CN1 is at 9, FF1 and FF2 are in state zero (Q low—$\bar{Q}$ high) and FF3 is in state one (Q high—$\bar{Q}$ low), with FF4 still in state one (Q high—$\bar{Q}$ low) providing a continuation of the previous high break (on-hook) output.

High-to-Low Output Transition

When 50 clock pulses (10KHz. have been counted by counter CN1, the output FF4 will be toggled from its high Q break output state to its low Q make output state to repeat the break-to-make input transition with a 5 msec. delay.

As previously described, upon the 50th clock pulse counted by CN1, gate G8 will provide a high-to-low output transition which is effective through gate G12 to toggle the FF4 to its zero state (Q low—$\bar{Q}$ high). This change causes the output to go from a high break to a low make to repeat the high-to-low input (lead 251) after a delay of 5 msec. (50 counts of the 10 KHz. clock). Thus, the entire input high break of 60 msec. has been repeated at the output with a 5 msec. delay.

The high-to-low transition at the Q output of FF4 energizes single-shot SS3 to produce a 1.7 $\mu$sec. low (the 2 $\mu$sec. low delayed 0.3 $\mu$sec. in DEL2) at the output of collector tie CT2, just as single-shot SS4 did, as previously discussed, when the output FF4 changed from its zero state to its one state at the leading edge of the output break interval. The low pulse at the output of CT2 resets counter CN1 to zero and resets flip-flops FF1, FF2 and FF3 to their zero states. In the meantime, the change at the Q and $\bar{Q}$ outputs of FF4 changes the outputs of gate G4 and collector tie CT1 from low to high. The high input to I1 is again effective as a low at the lower input to gate G5 to prevent further clock pulses from being counted in counter CN1.

The low output from DEL1 produces a low-to-high transition at the input to the timer ITM (from I5). Again, ITM holds its output high for about 5 msec. and then makes its output low to produce a high from I6 at the lower input to gate G6. All of the inputs to gate G6 are then high so as to cause a low output from collector tie CT2 as a direct clear at the CD input of counter CN1 and the CL inputs of FF1, FF2 and FF3.

Additional Input Transitions

The above process continues for each input pulse transition to repeat the input pulse as clock-pulse-synchronized output pulses, with each output transition delayed 5 msec. from the corresponding input transition. Whenever the input state changes from the output state, the counter CN1 (with flip-flops FF1, FF2 and FF3) counts 50 clock pulses (10KHz.) to measure 5 msec. At the end of the 5 msec., the output flip-flop FF4 is toggled so that the output state becomes the same as the input state. At this time, the circuit is reset so as to perform the same operations when the next input change takes place, etc.

Input Pulse Shorter Than 5 msec.

If an input change occurs but lasts for too short a time to allow the accumulation of a count of 50 clock pulses (less than 5 msec.), the input will first become different from the output (output of collector tie CT1 goes from high to low) but will revert to the same state as the output (output of collector tie CT1 goes back from low to high) before the counter CN1, etc. can toggle the output FF4. As discussed previously, the high-to-low change at the output of collector tie CT1 causes gate G6 to produce a high output through collector tie CT2 to allow counter CN1, etc. to count clock pulses. The high-to-low output of collector tie CT1 also causes timer ITM to produce a low-to-high output at once, to in turn also cause gate G6 to produce a high output. If the input reverts to the same state as the output before the output FF4 is toggled, the output of collector tie CT1 will revert from low to high. This makes the top input of gate G6 high; but, timer ITM is holding the lower input to gate G6 low. The low-to-high output from collector tie CT1 applies a low-to-high transition at the input to timer ITM to cause timer ITM to maintain its high output for about 5 msec. (or less depending upon the duration of the short input break) and then to cause its output to go from high to low. When the latter occurs, the lower input to gate G6 is made high and the resulting high-to-low output of gate G6 is extended through collector tie CT2 as a low direct clear to return counter CN1 to zero count and to return flip-flops FF1, FF2 and FF3 to their zero states. This will clear from counter CN1 any partial count (less than 50 clock pulses) caused by an input change lasting for insufficient time to be recognized as a legitimate signal. Thus, the output FF4 will not repeat that input change.

Fine Chatter

As above discussed with regard to a clear pulse, such as in FIG. 2, the following action occurs:

1. whenever the input changes to be different from the output, counter CN1, etc. counts for 5 msec. (50 clock pulses) and then toggles the output FF4 which disables clock gate G5 and resets counter CN1, etc.
2. whenever the output changes to become the same as the input or the input changes to become the same as the output, timer ITM starts a 5 msec. timing interval at the end of which it resets counter CN1, etc.

With regard to FIG. 3, those parts of the leading edge fine chatter which represent times when the input changes to be different from the output are $t_0$—$t_1$, $t_2$—$t_3$ and $t_4$—$t_5$ in line 1. During these intervals shown in line 2, clock pulses are counted in counter CN1, etc. Those parts of the leading edge chatter which represent times when the input changes to be the same as the output are $t_1$—$t_2$ and $t_3$—$t_4$ in lines 1 and 2. During these latter intervals, clock pulses are not counted in counter CN1, etc. If, for example, the leading edge lows amount to 2 msec., it will take 7 msec. for the counter CN1, etc. to arrive at the count of 50 (5 msec.). The trailing edge chatter, as shown in lines 1 and 2 of FIG. 3, involves times $t_7$—$t_8$, $t_9$—$t_{10}$ and $t_{11}$—$t_{12}$ during which clock pulses are counted and times $t_8$—$t_9$ and $t_{10}$—$t_{11}$ during which clock pulses are not counted. In the example shown, again 7 msec. will be required to count to 50. Of course, the extent and nature of fine chatter at the leading and trailing edges may differ such that an edge will require a little more and a little less time than the other for counter CN1, etc. to count to 50. This will cause the output pulse to vary a little from the length of the input pulse but not enough to be of any consequence.

At each of the times $t_1$, $t_3$, $t_8$ and $t_{10}$ in FIG. 3, the input timer ITM will start to timeout (5 msec.) but will be stopped from timing out at the times $t_2$, $t_4$, $t_9$ and $t_{11}$. The intervals of chatter will ordinarily be short enough and similar enough such that capacitor C1 of FIG. 19 will gain just about as much energy during one chatter direction as it loses during the other chatter direction. Thus, the chatter does not significantly alter the 5 msec. timeout of input timer ITM from time $t_5$ to $t_6$ and from $t_{12}$ to $t_{13}$. The high output of timer ITM in FIG. 25 will, through I6, hold the lower input to G6 low to prevent any fine chatter transition from producing an undesired clearing signal from the output of collector tie CT2.

Split Pulse

It will be recalled, with regard to FIG. 4, that a 7 msec. low split ($t_2$—$t_3$) may occur after the 5 msec. timing ($t_0$—$t_1$) at the high break leading edge. In telephone practice, the leading edge of a break interval is the point where a signaling circuit indicates an off-hook-make to on-hook-break transition. This is where a split pulse usually occurs, if at all, rather than at the on-hook-break to off-hook make transition, and the former is where a split must be bridged, if anywhere, when dealing with input telephone dial pulses.

The output timer OTM of FIG. 25 is used to bridge such a split. The output of timer OTM is normally low: if the output FF4 changes from its zero state (Q low) to its one state (Q high) at the end of the 5 msec. timing by counter CN1, etc., the low-to-high transition at the Q output of FF4 energizes timer OTM. When energized, timer OTM causes its output to go from low to high, to remain high for about 15 msec., and then to revert to low.

With switch S in FIG. 25 closed to ground as shown, the input to I1 is held low and the output of I2 is held high at the right input to gate G1. This enables gate G1 to pass low and high input changes from the collector of Q1.

If switch S1 is actuated so as to connect the output of timer OTM to the input of I2, instead of the connection of switch S1 to ground as shown in FIG. 25, the normal low output of timer OTM will perform the same function as the low ground. However, whenever output FF4 changes from its zero state (Q low) to its one state (Q high) to develop a low-to-high output transition, the output of timer OTM will go high for 15 msec. and then revert to low. This high output from timer OTM is effective through I2 to hold the right input of gate G1 low for 15 msec., thus to maintain the output of gate G1 high regardless of what may happen at its left input due to a change in the input information (such as the 7 msec. low split in FIG. 4). The low output of I2 causes the output of I3 to go high for 15 msec., which has no effect on single-shot SS1.

At the end of the 15 msec. timeout of output timer OTM, its output will revert to low to cause the output of I2 to go low-to-high at the right input to gate G1. This permits gate G1 to again pass input dial pulse changes to its output. When the output of I2 goes high, the output of I3 at the input to single-shot SS1 will carry a high-to-low transition, which causes SS1 to produce a change at its output from high to low for 25 μsec., then back to high. The 25 μsec. low pulse from SS1 is fed through R25 and I4 as a 25 μsec. high pulse at the upper input to gate G11. The output of gate G11 is allowed to reflect the input conditions during the 25 μsec. time. If the input is still a high break, the output of gate G11 will remain high due to the low at its lower input from the collector of the turned-on Q1. At the end of the 25 μsec. time, the upper input to gate G11 reverts to low to keep the output of gate G11 high regardless of any subsequent change of the input dial pulse information.

In order that output timer OTM does not perform a "pulse correction" function any more than necessary, if the input dial pulse had returned to a low make by the end of the 15 msec. timeout of timer OTM, the high from the collector of turned-off Q1 will produce a low at the output of gate G11 during the 25 μsec. interval when I4 passes to its output a high 25 μsec. pulse caused by single-shot SS1. This low pulse at the output of gate G11 is applied to the clear input CL of the output FF4 to reset it to its zero state (Q low—$\bar{Q}$ high) to at once cause the output pulse to change to a low make.

Initial Starting of Circuit

When the circuit of FIG. 25 is first supplied with power, counter CN1 and flip-flops FF1, FF2, FF3 and FF4 might be in any one of a number of combinations of conditions. When the DIAL PULSE INPUT supplies pulses, the input will either be the same as or different from the state of the output FF4. The circuit will go through some gyrations depending on its starting condition and on the comparison of its input and output states. At the latest, the first input or output state change, whichever occurs first, will bring the entire circuit into proper operation. Thus, a delay of perhaps 5 to 10 msec. at the most will find the circuit in synchronous operation.

It is to be understood that the above-described arrangement is illustrative of the application of the principles of the invention. Numerous other arrangements may be devised by those skilled in the art without departing from the spirit and scope of the invention.

What I claim is:

1. A circuit for repeating random input pulses as delayed-clock-pulse-synchronized output pulses comprising:

A. a source of clock pulses;

B. a counter for counting clock pulses applied thereto;

C. a two-state output device controlled by the counter to change state each time the counter counts a prescribed number of clock pulses;

D. a two-state input device controlled by the input pulses to change state each time the input pulse level changes; and, E. circuit means effective under the control of the input and output devices a. to allow application of clock pulses to the counter when the input and output devices are in opposite states b. and to prevent application of clock pulses to the counter when the input and output devices are in the same states.

2. The invention defined in claim 1 wherein:

A. the counter is resettable; and,

B. also is provided means effective under the control of the output device to reset the counter whenever the output device changes state.

3. The invention defined in claim 2 wherein:

A. also is provided input timing means controlled by the input and output devices to measure accumulation of time during which the input and output devices are in the same states; and
B. the reset means is also effective under the control of the input timing means to reset the counter whenever a prescribed time accumulates before the output device changes state.

4. A circuit for repeating random high-low level input pulses as delayed-clock-pulse-synchronized high-low level output pulses comprising:
A. a source of clock pulses;
B. a counter for counting clock pulses applied thereto;
C. an output device having low and high level output states and controlled by the counter to change state each time the counter counts a prescribed number of clock pulses;
D. an input device having low and high level states and controlled by input pulses to change state responsive to input pulse transitions;
E. an input gate controlled by the input device to repeat changes in state of the input device; and,
F. a clock gate effective under the control of the input gate and the output device
a. to allow application of clock pulses to the counter whenever the input gate repeats an input state opposite to the then existing output state; and
b. to prevent application of clock pulses to the counter whenever the input gate repeats an input state the same as the then existing output state.

5. The invention defined in claim 4 wherein:
A. the counter is resettable; and,
B. also is provided a reset circuit effective under the control of the output device to reset the counter whenever the output device changes state.

6. The invention defined in claim 5 wherein:
A. also is provided an input timer controlled by the clock gate to measure accumulation of time during which the input gate repeats an input state the same as the then existing output state; and,
B. the reset circuit is also effective under the control of the input timer to reset the counter whenever a prescribed time accumulates before the output device changes state.

7. The invention defined in claim 4 wherein:
A. the output device exhibits two different directional changes of state, one from low to high, the other from high to low;
B. also is provided an output timer controlled by the output device to measure a prescribed time interval after each change of state of the output device in one particular direction; and,
C. the input gate is also controlled by the output timer so that the input gate repeats changes in state of the input device only at times other than during the prescribed time interval.

8. The invention defined in claim 7 wherein:
A. the counter is resettable; and,
B. also is provided a reset circuit effective under the control of the output device to reset the counter whenever the output device changes state.

9. The invention defined in claim 8 wherein:
A. also is provided an input timer controlled by the clock gate to measure accumulation of time during which the input gate repeats an input state the same as the then existing output state; and,
B. the reset circuit is also effective under the control of the input timer to reset the counter whenever a prescribed time accumulates before the output device changes state.

10. The invention defined in claim 9 wherein:
A. the input pulses are essentially rectangular with highs of at least 20 milliseconds duration, with lows of at least 10 milliseconds duration, and with a pulse period repetition rate ranging from about 7.5 to about 12.5 pulse periods per second;
B. the source of clock pulses provides essentially rectangular highs and lows at a pulse period frequency in the order of 1,000 times the input pulse period repetition rate;
C. the output device is a bistable flip-flop;
D. the input device is a pulse repeater;
E. the input gate is a transmission gate controllable to allow or deny transmission;
F. the output timer is an analog timing circuit with a timeout in the order of 15 milliseconds;
G. the input timer is an analog timing circuit with a timeout in the order of 5 milliseconds; and,
H. the counter switches the state of the output flip-flop each time the counter counts a prescribed number of clock pulses representing an amount of time in the order of 5 milliseconds.